UNITED STATES PATENT OFFICE.

GEORGE J. CHERTOFF, OF CLEVELAND, OHIO.

RUBBER-COMPOUNDING MIXTURE.

1,379,743.  Specification of Letters Patent.  Patented May 31, 1921.

No Drawing.  Application filed March 20, 1918. Serial No. 223,660.

*To all whom it may concern:*

Be it known that I, GEORGE J. CHERTOFF, a citizen of the United States of America, residing at Cleveland, in the county of Cuyahoga and State of Ohio, have invented certain new and useful Improvements in Rubber-Compounding Mixtures, of which the following is a specification.

My invention relates to improvements in rubber compouding mixture, and has for its object the provision of an ingredient adapted for use in working or compounding rubber, which is designed materially to improve the completed product. My invention further contemplates the rubber product thus compounded and improved.

It is a matter of common knowledge among rubber manufacturers, that rubber compositions differ widely in their characteristics, but all are subject to more or less rapid deterioration, hardening with age and the blooming of sulfur. My present invention contemplates the deferring or avoidance of these undesirable features, through the production and incorporation of a small percentage of a suitable mixture or ingredient which will supplement the natural caoutchoucin the rubber.

Briefly stated, the improvement consists in effecting a suitable non-oxidizing mixture in the presence of heat of a suitable vegetable oil and an amorphous oxidized hydrocarbon of the resin group. This mixture is worked into the mass of the rubber, preferably during milling and in relatively small percentages, as three per cent. or less.

The resulting product will be found to resist the ordinary deteriorating conditions much better than when the rubber is worked without my improved mixture. Moreover, the sticky properties of the rubber, such as that prepared for rubber tape stock, is found to be greatly enhanced, while the sulfur ordinarily is prevented from blooming.

The employment of this mixture also permits the incorporation of desired percentages of cured buffed scrap for which it acts as a binder, in incorporating the rubber dust upon subsequent vulcanization.

Preferably the ingredients indicated are melted together into homogeneous fluid mixture before their incorporatin into the mass of rubber, although I do not wish to be understood as necessarily limiting my invention thereto. However, it should be observed that the addition of dissimilar ingredients other than those indicated may nullify or overcome the beneficial effect procurable through the use of my mixture.

The specific ingredients are compounded approximately in equal parts by weight of the resinous substance and the vegetable oils employed. Of these, I have used and recommend colophony or ordinary resin, dammar resin and copal gum. The preferred oils which I have used are palm oil, resin oil, pine oil and turpentine. It should be observed that these oils preferred for use herein, are relatively non-oxidizing, non-volatile and non-drying. Depending upon temperature conditions largely, the proportion of oils used in my compounding mixture may vary from 30% to 50% of the total weight.

These ingredients are mixed by first melting the resinous substance and then adding the desired percentage of vegetable oils, usually about fifty per cent. The resulting product is a solution which may most readily be employed in compounding the rubber therewith. It will be understood that any increase of the percentage of vegetable oil will insure a compounding mixture of lower viscosity. Extensive series of laboratory experiments indicate that the oils react directly upon the resin in the presence of heat. This serves to render the abiatic acid content much more active, which upon subjecting the rubber stock thereto, reacts upon the basic mineral content, forming definite chemical compounds, such as calcium resinate. The resultant stock approximates a neutral reaction and the resinate therein is strongly adhesive. These results may be approximated only in a minor degree by treating rubber stock with resin and with oils which have not previously been incorporated by pre-heating.

Depending somewhat upon the condition of the rubber stock to be treated, varying percentages of my improved mixtures may be worked into the rubber mass while it is being milled; such percentages ranging from one to three per cent. only, as compared with the rubber stock. After the compounded rubber has been cured in the manner desired, its properties will be found to have been materially enhanced in the manner already indicated, thereby economically obtaining a much more desirable product than otherwise might be secured.

Having now described the preferred mode of practising my invention, I claim as new, and desire to secure by Letters Patent, the following:—

1. A fluid rubber-compounding mixture, consisting of a resinous substance and a relatively non-volatile solvent incorporated in the presence of heat, substantially as set forth.

2. A fluid rubber-compounding mixture, consisting of a resinous substance and a relatively non-oxidizing, non-drying vegetable oil incorporated in the presence of heat, substantially as set forth.

3. A fluid rubber-compounding mixture, consisting of a resin, pine, and palm oil incorporated in the presence of heat, to effect solution, fluid at normal temperatures, substantially as set forth.

4. A fluid rubber-compounding mixture, consisting of a resinous substance and a relatively non-oxidizing vegetable oil incorporated in the presence of heat holding the same in solution, and approximating equal proportions by weight, substantially as set forth.

5. The method of producing a fluid rubber-compounding material, which consists in heating a resinous substance and thereafter incorporating in the presence of heat a relatively non-oxidizing vegetable oil, substantially as set forth.

6. A composition containing rubber stock vulcanized with a resinous substance and a vegetable oil pre-heated together, these aggregating not to exceed three per cent. of the rubber stock, substantially as set forth.

7. A composition containing rubber and cured buffed scrap vulcanized with a resinous substance and a vegetable oil pre-heated together and constituting less than two percent of the stock treated, substantially as set forth.

In testimony whereof I do now affix my signature in the presence of two witnesses.

GEORGE J. CHERTOFF.

Witnesses:
 GLADYS FORREST,
 ALBERT LYNN LAWRENCE.